United States Patent
Hattori et al.

(10) Patent No.: US 11,201,522 B2
(45) Date of Patent: Dec. 14, 2021

(54) MOTOR-DRIVEN COMPRESSOR

(71) Applicant: KABUSHIKI KAISHA TOYOTA JIDOSHOKKI, Kariya (JP)

(72) Inventors: Yuya Hattori, Kariya (JP); Takumi Maeda, Kariya (JP); Takuro Yamashita, Kariya (JP); Shinji Koike, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 80 days.

(21) Appl. No.: 16/725,427

(22) Filed: Dec. 23, 2019

(65) Prior Publication Data

US 2020/0212760 A1 Jul. 2, 2020

(30) Foreign Application Priority Data

Dec. 26, 2018 (JP) .............................. JP2018-242789

(51) Int. Cl.
*H02K 7/04* (2006.01)
*H02K 7/08* (2006.01)
*F04D 29/26* (2006.01)

(52) U.S. Cl.
CPC ............. *H02K 7/04* (2013.01); *F04D 29/266* (2013.01); *H02K 7/08* (2013.01)

(58) Field of Classification Search
CPC ... F04C 2230/605; F04D 29/266; H02K 7/04; H02K 7/08
USPC ........................................................ 310/51
See application file for complete search history.

(56) References Cited

U.S. PATENT DOCUMENTS

| | | | |
|---|---|---|---|
| 8,231,367 B2 | 7/2012 | Suefuji et al. | |
| 2008/0304994 A1* | 12/2008 | Ohtahara | F04C 18/0215 418/55.1 |
| 2011/0200471 A1* | 8/2011 | Kato | F01C 21/10 417/437 |

FOREIGN PATENT DOCUMENTS

| | | | | |
|---|---|---|---|---|
| EP | 3388673 A1 | * | 10/2018 | ......... F04C 18/0215 |
| JP | 57-131895 A | | 8/1982 | |
| JP | 2-91489 A | | 3/1990 | |
| JP | 9-287579 A | | 11/1997 | |
| JP | 2003-074480 A | | 3/2003 | |
| JP | 2005-140064 A | | 6/2005 | |
| JP | 2005-163687 A | | 6/2005 | |
| JP | 2005-188516 A | | 7/2005 | |
| JP | 4310827 B2 | | 8/2009 | |
| JP | 2012-052490 A | | 3/2012 | |
| KR | 1998-046616 A | | 9/1998 | |
| WO | 2016/059772 A1 | | 4/2016 | |
| WO | 2017/141703 A1 | | 8/2017 | |

* cited by examiner

*Primary Examiner* — Terrance L Kenerly
(74) *Attorney, Agent, or Firm* — Sughrue Mion, PLLC

(57) ABSTRACT

A compressor includes a housing, a stationary block, a drive shaft, a motor mechanism, a stationary scroll, and a movable scroll. The stationary block is fixed to the housing and is arranged between the motor mechanism and the movable scroll. The motor mechanism includes a stator and a rotor. The drive shaft is provided with a balance weight. The balance weight extends in the radial direction of the drive shaft and is arranged between the stationary block and the stator. The stator includes a stator core and a coil end. The balance weight covers a part of the coil end in the radial direction and the axial direction of the drive shaft.

3 Claims, 4 Drawing Sheets

MOTOR-DRIVEN COMPRESSOR

BACKGROUND

1. Field

The present disclosure relates to a motor-driven compressor.

2. Description of Related Art

Japanese Laid-Open Patent Publication No. 2003-74480 discloses a conventional motor-driven compressor (hereinafter, simply referred to as a compressor). The compressor includes a housing, a drive shaft, a motor mechanism, a stationary scroll, a movable scroll, and a stationary block.

The drive shaft is provided in the housing and rotational about a rotation axis. The motor mechanism is provided in the housing and rotates the drive shaft. The motor mechanism includes a stator and a rotor. The stator is fixed in the housing. The rotor is fixed to the drive shaft and is arranged in the stator to rotate together with the drive shaft. The stationary scroll is fixed to the housing and is arranged in the housing. The movable scroll is provided in the housing and is connected to the drive shaft. The stationary block is fixed to the housing and is arranged between the movable scroll and the motor mechanism. The stationary block rotationally supports the drive shaft.

The drive shaft of the compressor is provided with a balance weight. The balance weight is arranged between the movable scroll and the stationary block. The balance weight extends in the radial direction of the drive shaft so as to be separated from the rotation axis.

In the compressor, the motor mechanism rotates the drive shaft, so that the movable scroll orbits together with the drive shaft. Accordingly, the movable scroll defines a compression chamber with the stationary scroll. The movable scroll compresses refrigerant in the compression chamber. In this compressor, the centrifugal force generated by the balance weight through the rotation of the drive shaft acts on the drive shaft. This suppresses wobble in the radial direction of the drive shaft during rotation.

To further reduce the weight of the above-described conventional compressor, the weight of the balance weight may be reduced. However, a simple reduction in the weight of the balance weight will reduce the centrifugal force generated by the balance weight through rotation of the drive shaft. Thus, wobble of the drive shaft in the radial direction will not be sufficiently suppressed. Therefore, when reducing the weight of the balance weight, the amount by which the balance weight extends in the radial direction of the drive shaft needs to be extended, so that centrifugal force is generated at positions farther from the rotation axis. However, since the balance weight is arranged between the movable scroll and the stationary block in this compressor, it is difficult to provide a sufficient space between the movable scroll and the stationary block to allow the balance weight to be elongated in the radial direction of the drive shaft.

SUMMARY

It is an objective of the present disclosure to provide a motor-driven compressor that allows the drive shaft to rotate in a suitable manner while reducing the weight, and limits increase in the axial length.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a motor-driven compressor is provided that includes a housing, a drive shaft, a motor mechanism, a stationary scroll, a movable scroll, and a stationary block. The drive shaft is provided in the housing and is rotational about a rotation axis. The motor mechanism is provided in the housing and is configured to rotate the drive shaft. The stationary scroll is fixed to the housing and is arranged in the housing. The movable scroll is provided in the housing and is connected to the drive shaft, the movable scroll defining a compression chamber with the stationary scroll to compress refrigerant while rotating together with the drive shaft. The stationary block is fixed to the housing and is arranged between the motor mechanism and the movable scroll to support the drive shaft. The motor mechanism includes a stator fixed in the housing and a rotor that is fixed to the drive shaft and is arranged in the stator to rotate together with the drive shaft. A balance weight is provided to the drive shaft or the rotor. The balance weight extends in a radial direction of the drive shaft. The balance weight is arranged between the stationary block and the stator. The stator includes a tubular stator core and an annular coil end that protrudes from an end face of the stator core in an axial direction of the drive shaft. The balance weight covers a part of the coil end in the radial direction and the axial direction of the drive shaft. The stationary block includes a boss that protrudes towards the motor mechanism, a bearing that rotationally supports the drive shaft is provided inside the boss, an outer diameter of the boss is smaller than an inner diameter of the coil end, and the coil end covers at least a part of the boss in the axial direction of the drive shaft.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First and second embodiments will now be described with reference to the drawings. Specifically, the compressors of the first and second embodiments are scroll motor-driven compressors. Each compressor is installed in a vehicle (not shown) and included in the refrigeration circuit of the vehicle.

First Embodiment

Figure 1:
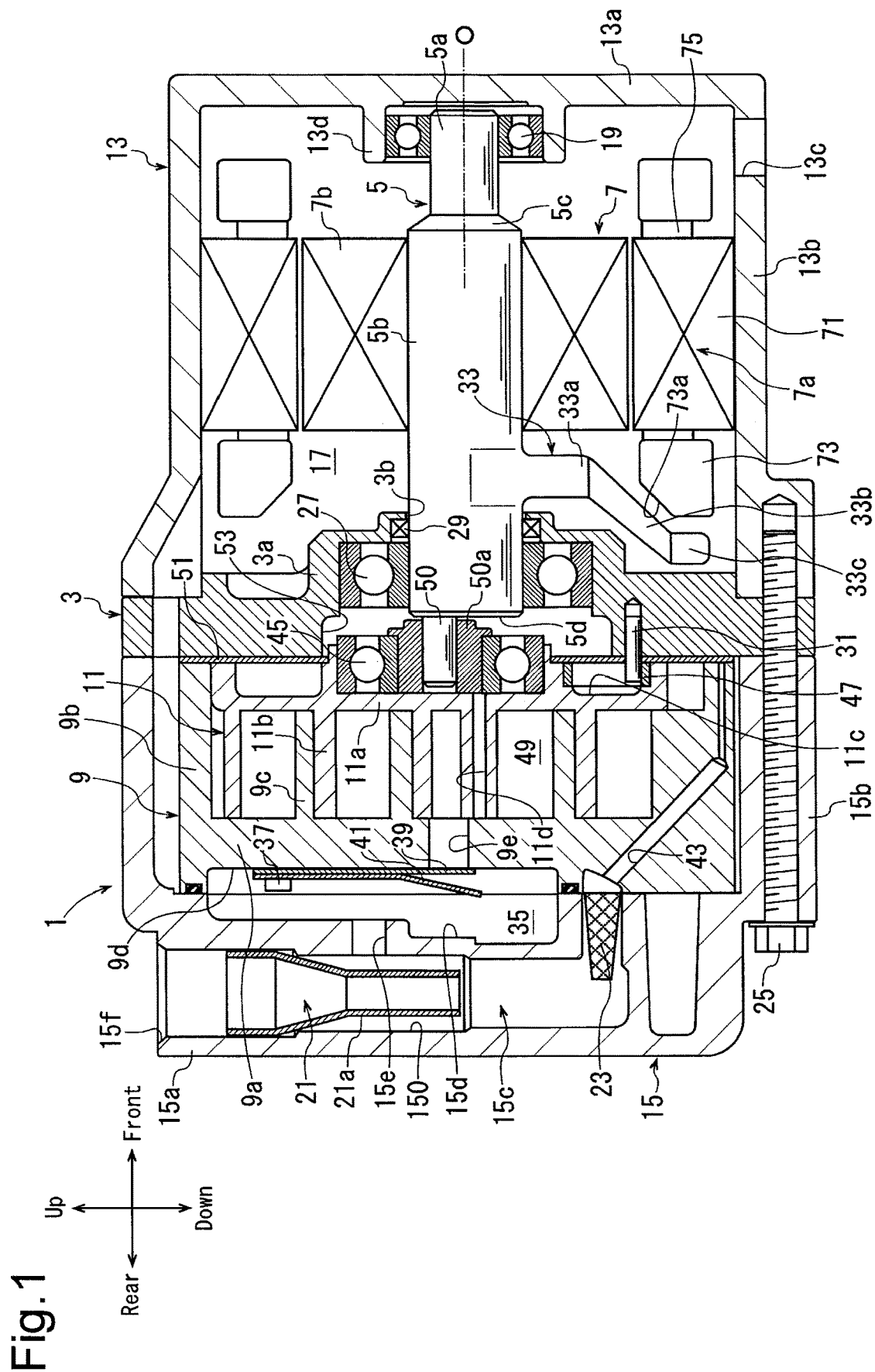
FIG. 1 is a cross-sectional view of a compressor according to a first embodiment.

As shown in FIG. 1, the compressor of the first embodiment includes a housing 1, a stationary block 3, a drive shaft 5, a motor mechanism 7, stationary scroll 9, and a movable scroll 11. The housing 1 includes a motor housing 13 and a compressor housing 15.

Figure 2:
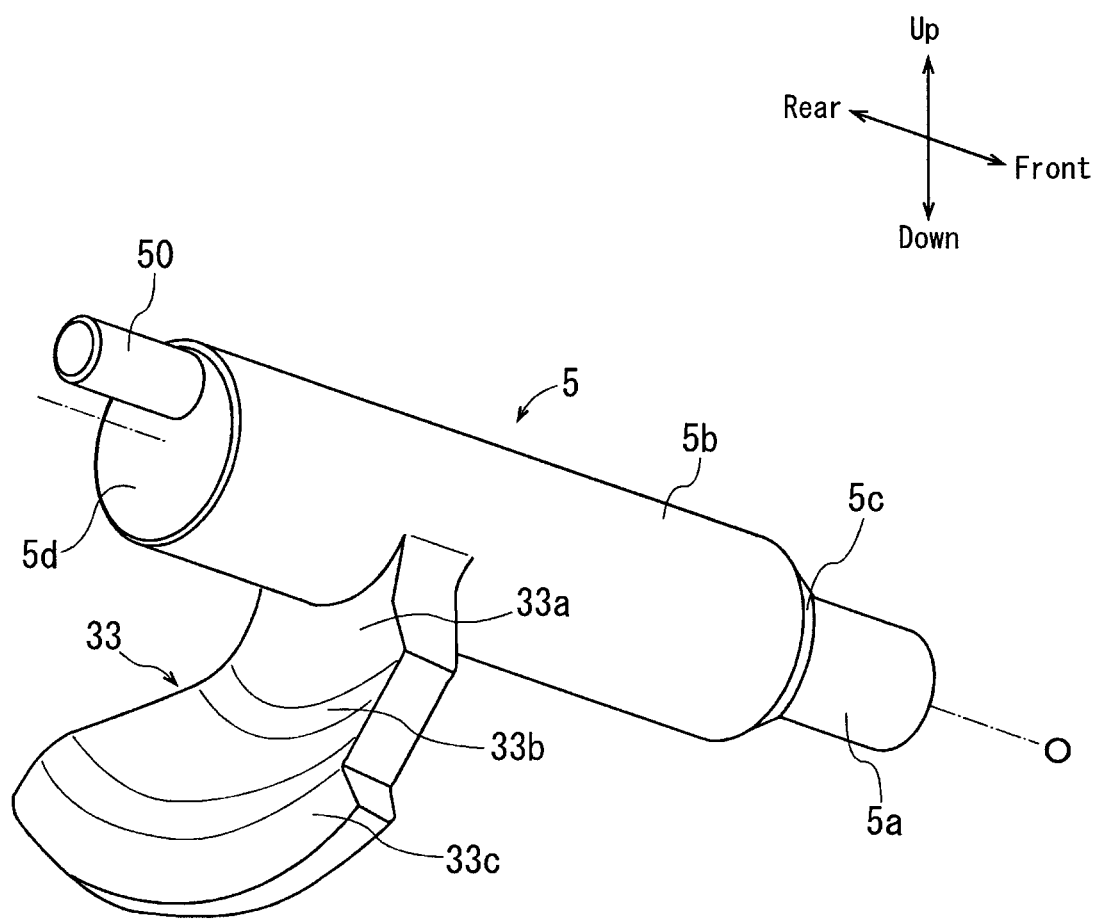
FIG. 2 is a perspective view of the drive shaft and the balance weight of the compressor according to the first embodiment.

As shown in FIG. 1, the side on which the motor housing 13 is located is defined as a front side, and the side on which the compressor housing 15 is located is defined as a rear side in the present embodiment. The front-rear direction of the compressor is defined accordingly. Also, the up-down direction of the compressor is defined in FIG. 1. In FIG. 2 and the subsequent drawings, the front-rear direction and the up-down direction are defined in correspondence with FIG. 1. These directions are examples used for illustrative purposes, and the orientation of the compressor is changed as necessary in correspondence with the vehicle on which the compressor is mounted.

The motor housing 13 has a front wall 13a and a first circumferential wall 13b. The front wall 13a is located at the front end of the motor housing 13, that is, at the front end of the housing 1, and extends in the radial direction of the motor housing 13. The first circumferential wall 13b is connected to the first circumferential wall 13b and extends rearward from the front wall 13a along a rotation axis O of the drive shaft 5. The front wall 13a and the first circumferential wall 13b constitute the tubular shape with a closed end of the motor housing 13. The front wall 13a and the first circumferential wall 13b define a motor chamber 17 in the motor housing 13. The rotation axis O is parallel with the front-rear direction of the compressor.

The motor housing 13 has a suction inlet 13c and a support portion 13d. The suction inlet 13c is provided in the first circumferential wall 13b and is continuous with the motor chamber 17. The suction inlet 13c is connected to an evaporator (not shown) and draw refrigerant into the motor chamber 17 via the evaporator. That is, the motor chamber 17 also functions as a suction chamber. The support portion 13d protrudes from the front wall 13a into the motor chamber 17. The support portion 13d has a cylindrical shape and incorporates a first radial bearing 19. The suction inlet 13c may be provided in the front wall 13a.

The compressor housing 15 has a rear wall 15a and a second circumferential wall 15b. The rear wall 15a is located at the rear end of the compressor housing 15, that is, at the rear end of the housing 1, and extends in the radial direction of the compressor housing 15. The second circumferential wall 15b is connected to the rear wall 15a and extends forward from the rear wall 15a in a direction along the rotation axis O. The compressor housing 15 has a tubular shape with a closed end constituted by the rear wall 15a and the second circumferential wall 15b.

The compressor housing 15 has an oil separation chamber 15c, a first recess 15d, a discharge passage 15e, and a discharge outlet 15f. The oil separation chamber 15c is located in the rear side in the compressor housing 15 and extends in the radial direction of the compressor housing 15. The first recess 15d is located in front of the oil separation chamber 15c in the compressor housing 15 and is recessed toward the oil separation chamber 15c. The discharge passage 15e extends in the direction of the rotation axis O in the compressor housing 15 and is connected to the oil separation chamber 15c and the first recess 15d. The discharge outlet 15f is continuous with the upper end of the oil separation chamber 15c and is open to the outside of the compressor housing 15. The discharge outlet 15f is connected to a condenser (not shown).

A separation tube 21 is fixed in the oil separation chamber 15c. The separation tube 21 is cylindrical and has an outer circumferential surface 21a. The outer circumferential surface 21a is coaxial with an inner circumferential surface 150 of the oil separation chamber 15c. The outer circumferential surface 21a and the inner circumferential surface 150 constitute a separator. A filter 23 is provided in a part of the oil separation chamber 15c that is below the separation tube 21.

Figure 4:
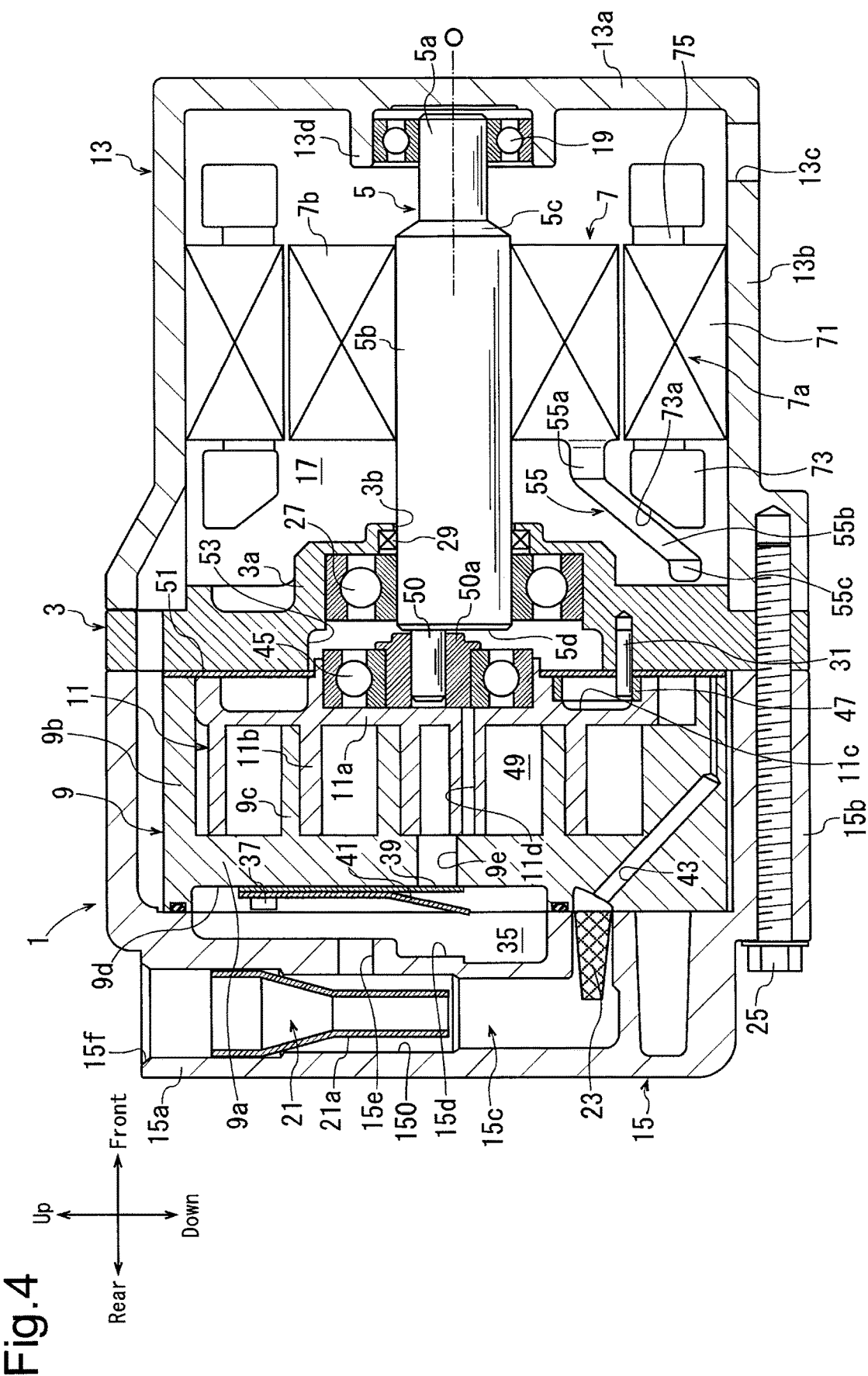
FIG. 4 is a cross-sectional view of a compressor according to a second embodiment.

The stationary block 3 is provided between the motor housing 13 and the compressor housing 15. The motor housing 13, the compressor housing 15, and the stationary block 3 are fastened together by bolts 25, which are inserted in the direction from the compressor housing 15 toward the motor housing 13. In this manner, the stationary block 3 is fixed to the motor housing 13 and the compressor housing 15, or the housing 1, while being held between the motor housing 13 and the compressor housing 15. The stationary block 3 is arranged between the motor mechanism 7 and the movable scroll 11 in the housing 1. Only one of the bolts 25 is illustrated in FIGS. 1 and 4. The method by which the stationary block 3 is fixed to the housing 1 may be designed in any suitable manner.

The stationary block 3 includes a boss 3a, which protrudes into the motor chamber 17, that is, toward the motor mechanism 7. The boss 3a has an insertion hole 3b at the distal end. The boss 3a incorporates a second radial bearing 27 and a seal member 29. The second radial bearing 27 is one example of a bearing of the present disclosure. The outer diameter of the boss 3a is smaller than the inner diameter of coil ends 73, which will be discussed below. Anti-rotation pins 31 are fixed to the rear surface of the stationary block 3. Each anti-rotation pin 31 extends rearward from the stationary block 3. Only one of the anti-rotation pins 31 is illustrated in FIGS. 1 and 4.

As shown in FIG. 2, the drive shaft 5 has a columnar shape extending in the rotation axis O. The drive shaft 5 includes a small diameter portion 5a, a large diameter portion 5b, and a tapering portion 5c. The small diameter portion 5a is located at the front end of the drive shaft 5. The large diameter portion 5b is located behind the small diameter portion 5a. The large diameter portion 5b has a larger diameter than the small diameter portion 5a. The large diameter portion 5b has a flat rear end face 5d at the rear end. The tapering portion 5c is located between the small diameter portion 5a and the large diameter portion 5b. The tapering portion 5c contacts the small diameter portion 5a at the front end. The tapering portion 5c increases in diameter toward the rear end and is connected to the large diameter portion 5b at the rear end.

An eccentric pin 50 is fixed to the large diameter portion 5b. The eccentric pin 50 is arranged at an eccentric position in relation to the rotation axis O on the rear end face 5d. The eccentric pin 50 has a columnar shape of a diameter smaller than the drive shaft 5 and extends rearward from the rear end face 5d.

As shown in FIG. 1, the drive shaft 5 is provided in the housing 1. The small diameter portion 5a of the drive shaft 5 is rotationally supported by the support portion 13d of the motor housing 13 with the first radial bearing 19. The rear portion of the large diameter portion 5b and the eccentric pin 50 are inserted into the insertion hole 3b of the stationary block 3 and located inside the boss 3a. In the boss 3a, the rear portion of the large diameter portion 5b is rotationally supported by the second radial bearing 27. Accordingly, the drive shaft 5 is allowed to rotate about the rotation axis O in the housing 1. A seal member 29 seals the boundary between the stationary block 3 and the drive shaft 5. The eccentric pin 50 is fitted into a bushing 50a in the boss 3a.

As shown in FIG. 2, a balance weight 33 is provided integrally with the large diameter portion 5b of the drive shaft 5. The balance weight 33 is arranged at an eccentric position in relation to the rotation axis O in the large diameter portion 5b. More specifically, the balance weight 33 is arranged on the opposite side of the rotation axis O from the eccentric pin 50.

Figure 3:
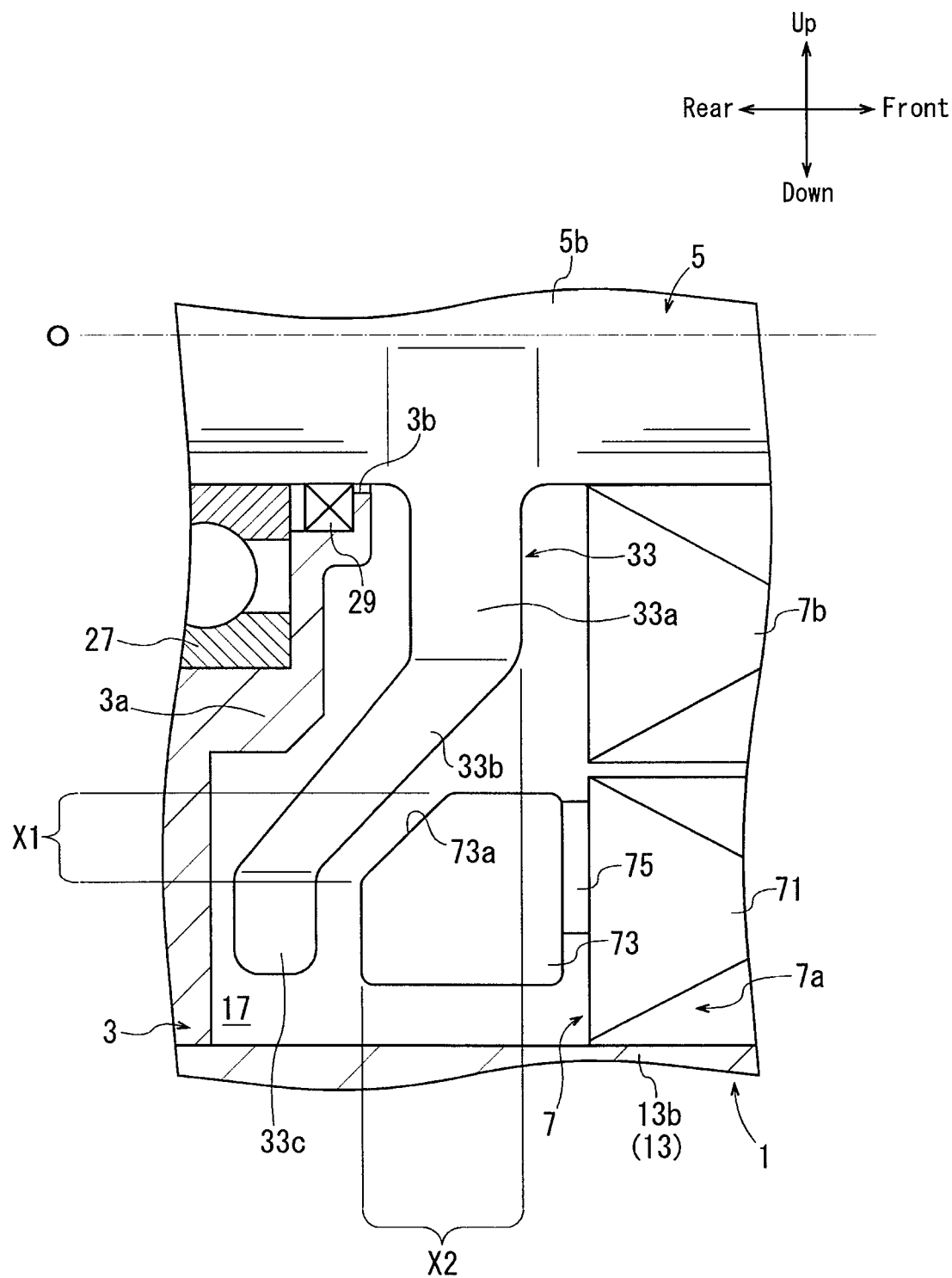
FIG. 3 is an enlarged partial cross-sectional view of the balance weight, the stator, and other components of the compressor according to the first embodiment.

The balance weight 33 substantially has a shape of a sectoral plate. In the radial direction of the drive shaft 5, the balance weight 33 extends away from the large diameter portion 5b, that is, from the large diameter portion 5b toward the first circumferential wall 13b of the motor housing 13. As shown in FIG. 3, the balance weight 33 includes a proximal portion 33a, an inclined portion 33b, and a distal portion 33c. The proximal portion 33a is connected to the large diameter portion 5b and extends substantially perpendicularly from the large diameter portion 5b in the radial direction of the drive shaft 5. The inclined portion 33b is connected to the proximal portion 33a. The inclined portion 33b extends rearward from the proximal portion 33a toward the stationary block 3 and obliquely in relation to the radial direction of the drive shaft 5. The distal portion 33c is connected to the inclined portion 33b and extends substantially perpendicularly from the inclined portion 33b in the radial direction of the drive shaft 5.

Since the drive shaft 5 is provided in the housing 1, the balance weight 33 is located in the motor chamber 17. That is, the balance weight 33 is located in the motor chamber 17 and between the stationary block 3 and the motor mechanism 7.

As shown in FIG. 1, the motor mechanism 7 is accommodated in the motor chamber 17 and is located in front of the balance weight 33. The motor mechanism 7 includes a stator 7a and a rotor 7b. The stator 7a is secured to the inner circumferential surface of the first circumferential wall 13b in the motor chamber 17. The stator 7a is connected to an inverter (not shown) provided outside the motor housing 13.

The stator 7a includes a stator core 71 and the coil ends 73. The stator core 71 is cylindrical. A coil 75 is wound about the stator core 71. The coil ends 73 are annular portions that protrude in the axial direction from the front and rear of the stator core 71. Each coil end 73 is constituted by part of the coil 75. Since the outer diameter of the boss 3a is smaller than the inner diameter of the coil ends 73 as described above, the coil end 73 covers the distal end of the boss 3a in the axial direction of the drive shaft 5 in the motor chamber 17.

As shown in FIG. 3, the coil end 73 has an inner circumferential surface 73a that faces the drive shaft 5. The rear part of the inner circumferential surface 73a has a shape that spreads in the radial direction of the drive shaft 5 toward the stationary block 3. More specifically, the rear part of the inner circumferential surface 73a extends along the inclined portion 33b of the balance weight 33 and is inclined to be progressively separated away from the balance weight 33. This shape of the inner circumferential surface 73a prevents the inclined portion 33b and the inner circumferential surface 73a from contacting each other. This in turn prevents the balance weight 33 and the coil end 73 from contacting each other.

In the motor chamber 17 of this compressor, the inclined portion 33b of the balance weight 33 covers the rear part of the inner circumferential surface 73a of the coil end 73 in the radial direction and the axial direction of the drive shaft 5.

Specifically, the inclined portion 33b covers the rear part of the inner circumferential surface 73a in the radial direction of the drive shaft 5 in a first region X1. In other words, the balance weight 33 extends from the drive shaft 5 to a position at which the inclined portion 33b covers the rear part of the inner circumferential surface 73a in the first region X1. Also, the inclined portion 33b covers the rear part of the inner circumferential surface 73a in the axial direction of the drive shaft 5 in a second region X2.

As shown in FIG. 1, the rotor 7b is arranged in the stator 7a and is fixed to the large diameter portion 5b of the drive shaft 5. When rotating in the stator 7a, the rotor 7b rotates the drive shaft 5 about the rotation axis O.

The stationary scroll 9 is fixed to the compressor housing 15 and is arranged in the compressor housing 15. The stationary scroll 9 includes a stationary base plate 9a, a stationary circumferential wall 9b, and a stationary volute wall 9c. The stationary base plate 9a is located at the rear end of the stationary scroll 9 and is shaped as a disk. The stationary base plate 9a has a second recess 9d and a discharge port 9e. The second recess 9d is recessed forward from the rear end face of the stationary base plate 9a. Since the stationary scroll 9 is fixed to the compressor housing 15, the second recess 9d faces the first recess 15d. As a result, the first recess 15d and the second recess 9d define a discharge chamber 35. The discharge chamber 35 is continuous with the oil separation chamber 15c via the discharge passage 15e. The discharge port 9e extends in the direction of the rotation axis O in the stationary base plate 9a and is continuous with the second recess 9d and is thus continuous with the discharge chamber 35.

A discharge reed valve 39 and a retainer 41 are attached to the stationary base plate 9a by a pin 37. The pin 37, the discharge reed valve 39, and the retainer 41 are arranged in the discharge chamber 35. The discharge reed valve 39 is elastically deformed to selectively open and close the discharge port 9e. The retainer 41 regulates the amount of elastic deformation of the discharge reed valve 39.

The stationary circumferential wall 9b is connected to the stationary base plate 9a at the outer periphery of the stationary base plate 9a and extends forward in a tubular shape. The stationary volute wall 9c projects from the front face of the stationary base plate 9a and is integrated with the stationary circumferential wall 9b inside the stationary circumferential wall 9b.

The stationary scroll 9 has a supply passage 43. The supply passage 43 extends through the stationary base plate 9a and the stationary circumferential wall 9b. Accordingly, the rear end of the supply passage 43 is opened in the rear end face of the stationary base plate 9a, and the front end of the supply passage 43 is opened in the front end face of the stationary circumferential wall 9b. The supply passage 43 is continuous with the oil separation chamber 15c via the filter 23. The supply passage 43 may be designed to have any suitable shape.

The movable scroll 11 is provided in the compressor housing 15 and is located between the stationary scroll 9 and the stationary block 3. The movable scroll 11 includes a movable base plate 11a and a movable volute wall 11b. The movable base plate 11a is located at the front end of the movable scroll 11 and is shaped as a disk. The movable base plate 11a rotationally supports the bushing 50a via a third radial bearing 45. Accordingly, the movable scroll 11 is connected to the drive shaft 5 at an eccentric position in relation to the rotation axis O through the bushing 50a and the eccentric pin 50.

The movable base plate 11a has anti-rotation holes 11c, which receive the anti-rotation pins 31 with play. A cylindrical ring 47 is fitted in each of the anti-rotation holes 11c with play.

The movable volute wall 11b projects from the front face of the movable base plate 11a and extends toward the stationary base plate 9a. The movable volute wall 11b has a supply hole 11d in the vicinity of the center. The supply hole 11d is opened at the front end of the movable volute wall 11b and extends through the movable base plate 11a in the front-rear direction of the movable volute wall 11b.

The stationary scroll 9 and the movable scroll 11 mesh with each other. Accordingly, a compression chamber 49 is defined between the stationary scroll 9 and the movable scroll 11 by the stationary base plate 9a, the stationary volute wall 9c, the movable base plate 11a, and the movable volute wall 11b. The compression chamber 49 is continuous with the discharge port 9e.

An elastic plate 51 is provided between the stationary block 3 and the set of the stationary scroll 9 and the movable scroll 11. The stationary scroll 9 and the movable scroll 11 contact the stationary block 3 via the elastic plate 51. The elastic plate 51 is made of a metal thin plate. The movable scroll 11 is urged toward the stationary scroll 9 by the restoring force of the elastic plate 51 when it is elastically deformed.

The movable base plate 11a and the elastic plate 51 define a back pressure chamber 53 inside the boss 3a of the stationary block 3. The back pressure chamber 53 is continuous with the supply hole 11d. Although not illustrated, a suction passage is defied by the stationary block 3, the stationary circumferential wall 9b, and the outermost circumferential portion of the movable volute wall 11b. The suction passage connects the motor chamber 17 to the compression chamber 49.

In this motor-driven compressor, the motor mechanism 7 is activated while being controlled by the inverter so as to rotate the drive shaft 5 about the rotation axis O. This rotates the movable scroll 11, so that the movable base plate 11a slides on the distal end of the stationary volute wall 9c and that the stationary volute wall 9c and the movable volute wall 11b slide on each other. At this time, each anti-rotation pin 31 rolls while sliding on the inner circumferential surface of the ring 47, which allows the movable scroll 11 to orbit while restricting rotation of the movable scroll 11. The orbiting motion of the movable scroll 11 draws refrigerant in the motor chamber 17 into the compression chamber 49 via the suction passage. The compression chamber 49 compresses the refrigerant inside while reducing its volume by the orbiting motion of the movable scroll 11.

In this compressor, the orbiting motion of the movable scroll 11 slightly opens the supply hole 11d to the compression chamber 49. This causes some of the high-pressure refrigerant in the compression chamber 49 to flow into the back pressure chamber 53 via the supply hole 11d, so that the pressure in the back pressure chamber 53 becomes high. Accordingly, in this compressor, the pressure of the elastic plate 51 and the back pressure chamber 53 urges the movable scroll 11 toward the stationary scroll 9, so that the compression chamber 49 is sealed in a suitable manner.

The high-pressure refrigerant that has been compressed in the compression chambers 49 is discharged to the discharge chamber 35 from the discharge port 9e and reaches the oil separation chamber 15c from the discharge chamber 35 via the discharge passage 15e. When the high-pressure refrigerant circles between the outer circumferential surface 21a of the separation tube 21 and the inner circumferential surface 150 of the oil separation chamber 15c, lubricant is separated from the refrigerant, and then the refrigerant flows through inside the separation tube 21 and is discharged from the discharge outlet 15f.

The lubricant separated from the refrigerant gas is stored in the oil separation chamber 15c. The lubricant then flows through the supply passage 43 via the filter 23, so as to be supplied to and lubricate the sliding sections between the stationary scroll 9 and the movable scroll 11. The lubricant flowing through the supply passage 43 is also supplied to the inside of the motor chamber 17 other than the gap between the second radial bearing 27 and the drive shaft 5.

In this compressor, the movable scroll 11 is connected to the drive shaft 5 through the eccentric pin 50 and the bushing 50a. Thus, when the drive shaft 5 rotates, the centrifugal force accompanying the orbiting motion of the movable scroll 11 acts on the drive shaft 5. When the drive shaft 5 rotates, the centrifugal force generated by the balance weight 33 also acts on the drive shaft 5. These centrifugal forces act on the drive shaft 5, which rotates about the rotation axis O, in directions intersecting with the rotation axis O.

In this compressor, the balance weight 33 is provided to the drive shaft 5 and is arranged between the stationary block 3 and the stator 7a. Thus, this compressor has greater flexibility in design of the balance weight 33 than a configuration in which the balance weight 33 is arranged in the boss 3a of the stationary block 3, that is, between the movable scroll 11 and the stationary block 3. Specifically, in the first region X1, the inclined portion 33b of the balance weight 33 covers a part of the inner circumferential surface 73a of the coil end 73, or the rear part of the inner circumferential surface 73a, in the radial direction of the drive shaft 5. This allows the balance weight 33 of this compressor to extend to a position that is sufficiently far from the rotation axis O in the radial direction of the drive shaft 5. The balance weight 33 is thus capable of generating centrifugal force at a position that is sufficiently far from the rotation axis O during rotation of the drive shaft 5.

Accordingly, in this compressor, the balance weight 33 substantially has a sectoral shape to reduce the weight and cancel the centrifugal force of the movable scroll 11 acting on the drive shaft 5 by the centrifugal force generated by the balance weight 33 in a suitable manner. Therefore, in this compressor, the balance weight 33 suppresses wobble of the drive shaft 5 in the radial direction during rotation of the drive shaft 5 in a suitable manner.

Also, in this compressor, the inclined portion 33b of the balance weight 33 covers the rear part of the inner circumferential surface 73a of the coil end 73 in the axial direction of the drive shaft 5 in the second region X2. Thus, in this compressor, the balance weight 33 and the stator 7a, that is, the balance weight 33 and the motor mechanism 7 can be brought closer to each other in the axial direction even though the balance weight 33 is arranged between the stationary block 3 and the stator 7a.

Accordingly, the compressor of the first embodiment allows the drive shaft 5 to rotate in a suitable manner while reducing the weight, and limits increase in the axial length.

In particular, the balance weight 33 of the compressor is provided integrally with the large diameter portion 5b of the drive shaft 5. This configuration reduces the number of components as compared to a case in which the balance weight 33 and the drive shaft 5 are formed separately and the balance weight 33 is attached to the large diameter portion 5b, for example, by press fitting. Also, in this compressor, the balance weight 33 can be provided at a position on the opposite side of the rotation axis O from the eccentric pin 50 in the large diameter portion 5b without an operation for positioning the balance weight 33 with respect to the large diameter portion 5b. Therefore, in this compressor, the balance weight 33 is capable of suppressing wobble of the drive shaft 5 in a direction intersecting with the rotation axis O in a suitable manner, while facilitating the manufacture.

The inner circumferential surface 73a of the coil end 73 has a shape that spreads in the radial direction of the drive shaft 5 toward the stationary block 3. Also, in this compressor, the inclined portion 33b of the balance weight 33 and the inner circumferential surface 73a of the coil end 73 are prevented from contacting each other in the motor chamber 17. Since this allows the balance weight 33 of this compressor to extend to a position that is sufficiently far from the rotation axis O in the radial direction of the drive shaft 5, the weight of the balance weight 33 can be reduced in a suitable manner. Also, since the balance weight 33 and the stator 7a can be brought sufficiently close to each other in the axial direction, increase in the axial length of the compressor is limited to a sufficient level.

Further, since the outer diameter of the boss 3a of the stationary block 3 of this compressor is smaller than the inner diameter of the coil end 73, the coil end 73 covers the distal end of the boss 3a in the axial direction of the drive shaft 5 in the motor chamber 17. Accordingly, the stationary block 3 and the coil end 73, that is, the stationary block 3 and the motor mechanism 7 are brought close to each other in the axial direction in a suitable manner. This configuration also limits increase in the axial length of the compressor.

Second Embodiment

As shown in FIG. 4, the compressor according to the second embodiment includes a balance weight 55 in place of the balance weight 33. The balance weight 55 is provided integrally with the rear face of the rotor 7b to extend rearward from the rotor 7b. Accordingly, the balance weight 55 is located between the stationary block 3 and the motor mechanism 7 in the motor chamber 17. Also, since the rotor 7b is fixed to the large diameter portion 5b of the drive shaft 5, the balance weight 55 is arranged on the opposite side of the rotation axis O from the eccentric pin 50.

Although not illustrated in detail, the balance weight 55 substantially has a shape of a sectoral plate like the balance weight 33. The balance weight 55 includes a proximal portion 55a, an inclined portion 55b, and a distal portion 55c. The proximal portion 55a is connected to the rotor 7b and extends linearly rearward from the rotor 7b. The inclined portion 55b is connected to the proximal portion 55a. The inclined portion 55b extends toward the stationary block 3 and obliquely in relation to the radial direction of the drive shaft 5. The distal portion 55c is connected to the inclined portion 55b and extends linearly rearward from the inclined portion 55b.

In the motor chamber 17 of this compressor also, the inclined portion 55b of the balance weight 55 covers the rear part of the inner circumferential surface 73a of the coil end 73 in the radial direction and the axial direction of the drive shaft 5. The other components of the compressor of the second embodiment are configured identically with the corresponding components of the compressor of the first embodiment. Accordingly, these components are identified by the same reference numbers, and detailed description thereof is omitted herein.

Since the rotor 7b rotates about the rotation axis O together with the drive shaft 5, the centrifugal force generated by the balance weight 55 acts on the drive shaft 5 via the rotor 7b. The inclined portion 55b of the balance weight 55 covers the rear part of the inner circumferential surface 73a of the coil end 73 in the radial direction of the drive shaft 5. Accordingly, this compressor is also capable of reducing the weight and cancelling the centrifugal force of the movable scroll 11 acting on the drive shaft 5 by the centrifugal force generated by the balance weight 55 in a suitable manner. Therefore, in this compressor, the balance weight 55 suppresses wobble of the drive shaft 5 in the radial direction during rotation of the drive shaft 5 in a suitable manner.

Also, the inclined portion 55b of the balance weight 55 covers the rear part of the inner circumferential surface 73a of the coil end 73 in the axial direction of the drive shaft 5. Thus, in this compressor also, the balance weight 55 and the motor mechanism 7 can be brought closer to each other in the axial direction of the stator 7a even though the balance weight 55 is arranged between the stationary block 3 and the stator 7a. Other operations of this compressor are the same as those of the compressor according to the first embodiment.

Although only the first and second embodiments have been described so far, the present disclosure is not limited to the first and second embodiments, but may be modified as necessary without departing from the scope of the invention.

For example, in the compressor of the first embodiment, the balance weight 33 substantially has a shape of a sectoral plate. However, the present disclosure is not limited to this. For example, the balance weight 33, including the shapes of the proximal portion 33a, the inclined portion 33b, and the distal portion 33c, may be designed to have any suitable shape in correspondence with the magnitude of the centrifugal force that accompanies the orbiting motion of the movable scroll 11. The same applies to the balance weight 55 of the compressor of the second embodiment.

Further, in the compressor of the first embodiment, the balance weight 33 may be provided to the drive shaft 5 by fixing the balance weight 33 to the large diameter portion 5b by a fixing means such as press-fitting or screws.

Also, in the compressor of the second embodiment, the balance weight 55 may be provided to the rotor 7b by fixing the balance weight 55 to the rotor 7b by a fixing means such as press-fitting or screws.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A motor-driven compressor comprising:
a housing;
a drive shaft that is provided in the housing and is rotational about a rotation axis;
a motor mechanism that is provided in the housing and is configured to rotate the drive shaft;
a stationary scroll that is fixed to the housing and is arranged in the housing;
a movable scroll that is provided in the housing and is connected to the drive shaft, the movable scroll defining a compression chamber with the stationary scroll to compress refrigerant while rotating together with the drive shaft; and
a stationary block that is fixed to the housing and is arranged between the motor mechanism and the movable scroll to support the drive shaft, wherein
the motor mechanism includes
a stator fixed in the housing, and
a rotor that is fixed to the drive shaft and is arranged in the stator to rotate together with the drive shaft,
a balance weight is provided to the drive shaft or the rotor, the balance weight extending in a radial direction of the drive shaft,
the balance weight is arranged between the stationary block and the stator,
the stator includes
a tubular stator core, and
an annular coil end that protrudes from an end face of the stator core in an axial direction of the drive shaft,
the balance weight covers a part of the coil end in the radial direction and the axial direction of the drive shaft,
the stationary block includes a boss that protrudes toward the motor mechanism,
a bearing that rotationally supports the drive shaft is provided inside the boss,
an outer diameter of the boss is smaller than an inner diameter of the coil end, and
the coil end covers at least a part of the boss in the axial direction of the drive shaft,
the balance weight includes
an inclined portion that extends toward the stationary block and in the radial direction of the drive shaft,
a proximal portion that connects one end of the inclined portion to the drive shaft or the rotor, and
a distal portion connected to an other end of the inclined portion,
the proximal portion of the balance weight is opposed to the bearing in the axial direction of the drive shaft and is opposed to the coil end in the radial direction of the drive shaft, and
the distal portion of the balance weight is opposed to the bearing in the radial direction of the drive shaft and is opposed to the coil end in the axial direction of the drive shaft.

2. The motor-driven compressor according to claim 1, wherein the balance weight is provided integrally with the drive shaft.

3. The motor-driven compressor according to claim 1, wherein
the coil end includes an inner circumferential surface that spreads in the radial direction of the drive shaft toward the stationary block, and
the inclined portion covers a part of the inner circumferential surface.

* * * * *